United States Patent
Cudak et al.

(10) Patent No.: US 12,381,754 B2
(45) Date of Patent: Aug. 5, 2025

(54) AUGMENTED FUNCTIONS FOR COOPERATIVE ENHANCEMENT

(71) Applicant: Lenovo (United States) Inc., Morrisville, NC (US)

(72) Inventors: Gary D. Cudak, Wake Forest, NC (US); Nathan Peterson, Oxford, NC (US); John M. Petersen, Wake Forest, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 558 days.

(21) Appl. No.: 17/696,588

(22) Filed: Mar. 16, 2022

(65) Prior Publication Data
US 2023/0299995 A1    Sep. 21, 2023

(51) Int. Cl.
*H04W 4/00*    (2018.01)
*H04L 12/28*    (2006.01)

(52) U.S. Cl.
CPC ...... *H04L 12/2814* (2013.01); *H04L 12/2816* (2013.01); *H04L 12/2827* (2013.01); *H04L 2012/285* (2013.01)

(58) Field of Classification Search
CPC ............ H04L 12/2814; H04L 12/2816; H04L 12/2827; H04L 2012/285
USPC ........................................ 370/338
See application file for complete search history.

(56) References Cited

U.S. PATENT DOCUMENTS

| | | | |
|---|---|---|---|
| 2019/0311513 A1* | 10/2019 | Han | H04L 67/131 |
| 2020/0090405 A1* | 3/2020 | Lagmanson | G06T 19/006 |
| 2020/0168015 A1* | 5/2020 | Rosenberg | G07C 9/00571 |
| 2021/0301985 A1* | 9/2021 | Brown | G05B 23/0221 |
| 2022/0108262 A1* | 4/2022 | Cella | G05B 19/41885 |
| 2022/0351218 A1* | 11/2022 | Karri | G06N 20/00 |
| 2023/0360342 A1* | 11/2023 | Kim | G06T 19/006 |

* cited by examiner

*Primary Examiner* — Chuong T Ho
(74) *Attorney, Agent, or Firm* — Kunzler Bean & Adamson (57) ABSTRACT

For augmented functions, a method determines a support relationship between a first device and a second device in a physical environment, wherein at least the first device is an electronic device. The method determines an augmented function for the first device, wherein the augmented function provides the support relationship. The method executes the augmented function on the first device.

17 Claims, 5 Drawing Sheets

AUGMENTED FUNCTIONS FOR COOPERATIVE ENHANCEMENT

FIELD

The subject matter disclosed herein relates to augmented functions and more particularly relates to augmented functions for cooperative enhancement.

BACKGROUND

Physical environments often include multiple devices.

BRIEF SUMMARY

A method for augmented functions is disclosed. The method determines a support relationship between a first device and a second device in a physical environment, wherein at least the first device is an electronic device. The method determines an augmented function for the first device, wherein the augmented function provides the support relationship. The method executes the augmented function on the first device. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
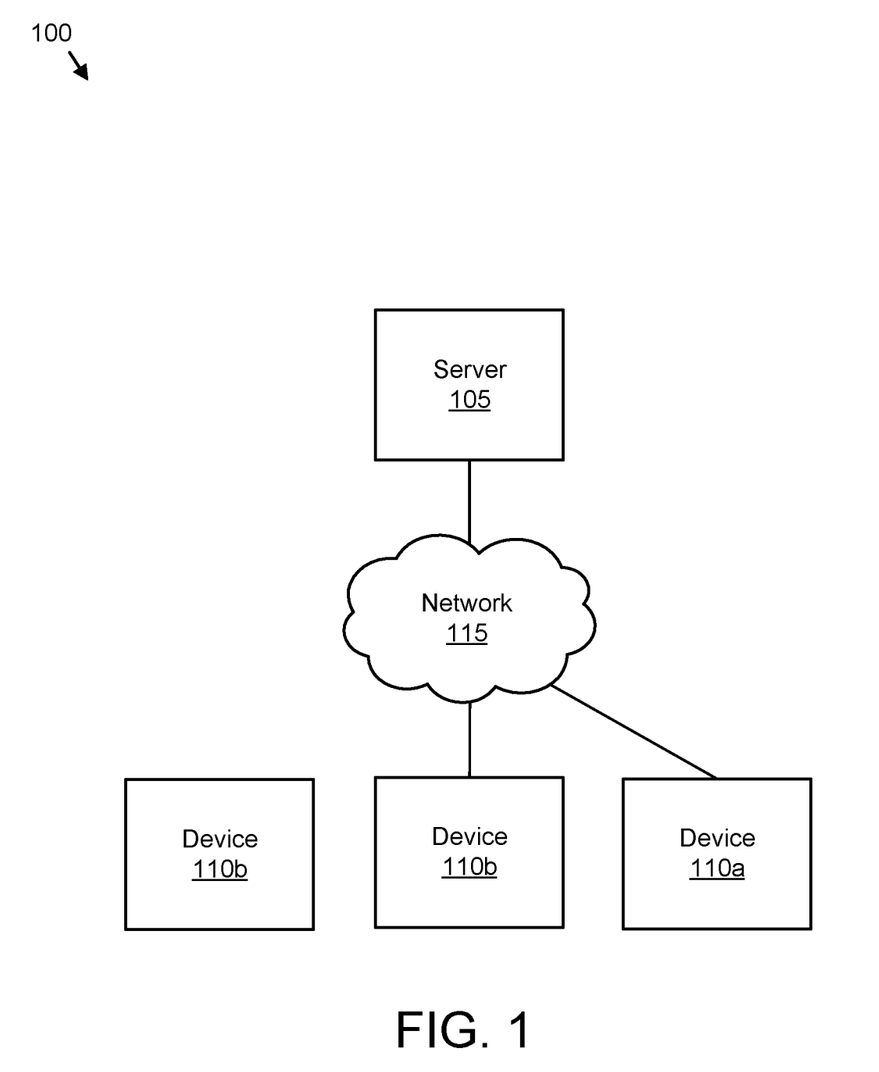
FIG. 1 is a schematic block diagram illustrating one embodiment of an augmented function system.

FIG. 1 is a schematic block diagram illustrating one embodiment of an augmented function system 100. The augmented function system 100 may support devices 110. In one embodiment, the augmented function system 100 supports devices 110 in a physical environment. In the depicted embodiment, the augmented function system 100 includes at least one first device 110a and at least one second device 110b. The first device 110a may be a programmable electronic device. In one embodiment, the augmented function system 100 includes a network 115 and/or server 105.

A second device 110b may be an electronic device such as a refrigerator, a coffee maker, and the like. In addition, a second device 110b may be a programmable electronic device such as an audio assistant, a television set, and the like. In a certain embodiment, the second device 110b is not an electronic device. For example, the second device 110b may be a door, a window, and the like.

The network 115 may be the Internet, a mobile telephone network, a Wi-Fi network, a local area network, and combinations thereof. The first device 110a may communicate with a second device 110b via the network 115. The first device 110a may also communicate with the server 105 via the network 115. In one embodiment, a second device 110b communicates with the server 105 via the network 115.

Devices 110 in the physical environment are typically configured to function without interacting with other devices 110. However, many first devices 110 are capable of supporting other devices 110 in the physical environment. For example, a security camera first device 110a is capable of monitoring a refrigerator second device 110b for leaks. Unfortunately, the first device 110a is not easily configured to support second devices 110. The embodiments determine a support relationship between a first device 110a and a second device 110b. The embodiments further determine an augmented function for the first device 110a that provides the support relationship and executes the augmented function. As a result, the first device 110a is easily configured to support a second device 110b, improving the efficiency and functionality of the augmented function system 100 and the first device 110a and/or second device 110b as will be described hereafter.

Figure 2A:
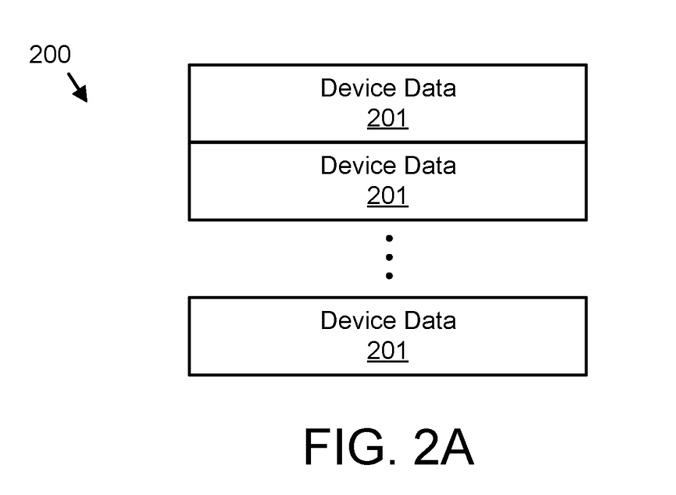
FIG. 2A is a schematic block diagram illustrating one embodiment of environment data.

FIG. 2A is a schematic block diagram illustrating one embodiment of environment data 200. The environment data 200 may record data for a plurality of devices 110. The environment data 200 may record data for a plurality of devices 110 in a single physical environment. In addition, the environment data 200 may record data for a plurality of devices 110 and a plurality of physical environments. The environment data 200 may be organized as a data structure in a memory. In the depicted embodiment, the environment data 200 includes a plurality of device data 201 as will be described in FIG. 2B.

Figure 2B:
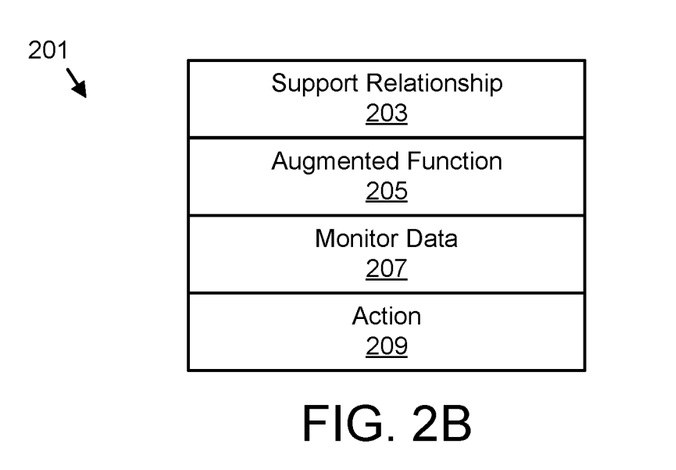
FIG. 2B is a schematic block diagram illustrating one embodiment of device data.

FIG. 2B is a schematic block diagram illustrating one embodiment of the device data 201 of FIG. 2A. In the depicted embodiment, the device data includes a support relationship 203, an augmented function 205, monitor data 207, and an action 209.

The support relationship 203 may describe support that a first device 110a can provide to a second device 110b. The support relationship 203 may identify the first device 110a and/or the second device 110b. The support relationship 203 may be included with the first device 110a. In addition, the support relationship 203 may be included with the second device 110b.

The support relationship 203 may associated with the first device 110a and the second device 110b. Table 1 includes examples of first devices 110, second devices 110 and corresponding support relationships 203 that are in no way limiting.

TABLE 1

| First device 110a | Second device 110b | Support relationship 203 |
|---|---|---|
| Security Camera | Refrigerator | Visual Monitor Water |
| Security Camera | Refrigerator | Visual Monitor Open |
| Security Camera | Coffee Maker | Visual Monitor Water |

TABLE 1-continued

| First device 110a | Second device 110b | Support relationship 203 |
|---|---|---|
| Security Camera | Door | Visual Monitor Open |
| Security Camera | Window | Visual Monitor Open |
| Security Camera | Room Lights | Visual Monitor Active |
| Security Camera | Audio Assistant | Visual Monitor Unplugged |
| Television Remote | Washer | Audio Monitor Water |
| Television Remote | Dishwasher | Audio Monitor Water |
| Television Remote | Washer | Audio Monitor Active |
| Television Remote | Dishwasher | Audio Monitor Active |
| Audio Assistant | Washer | Audio Monitor Water |
| Audio Assistant | Dishwasher | Audio Monitor Water |
| Audio Assistant | Washer | Audio Monitor Active |
| Audio Assistant | Dishwasher | Audio Monitor Active |

For example, if the first device 110a is a security camera and the second device 110b is a refrigerator, the relevant support relationships 203 may include a visual monitor water support relationship 203 of visually monitoring the refrigerator second device 110b for leaking water and a visual monitor open support relationship 203 of visually monitoring the refrigerator second device 110b for an open door.

The augmented function 205 may execute on the first device 110a to provide the support relationship 203. The augmented function 205 may be created by the manufacturer of the first device 110a. In addition, the augmented function 205 may be created by a third party. The augmented function 205 may be included with the first device 110a. In addition, the augmented function 205 may be included with the second device 110b. Table 2 includes examples of support relationships 203 and corresponding augmented functions 205 that are in no way limiting.

TABLE 2

| Support relationship 203 | Augmented Function 205 |
|---|---|
| Visual Monitor Water | Detect water on floor |
| Visual Monitor Water | Detect dripping water |
| Visual Monitor Open | Detect an open door or window |
| Visual Monitor Active | Detect activity beyond time limit |
| Visual Monitor Unplugged | Device unplugged |
| Visual Monitor Position | Position to monitor |
| Audio Monitor Water | Detect dripping water |
| Audio Monitor Open | Detect outside sounds |
| Audio Monitor Active | Detect activity beyond time limit |

For example, a detect outside sounds augmented function 205 may detect sounds characteristic of outside activity, possibly indicating an open window or door, for the audio monitor open support relationship 203. Similarly, a detect water on floor augmented function 205 may detect water on the floor near the second device 110b for a visual monitor water support relationship 203. In one embodiment, a position to monitor augmented function 205 positions the first device 110a to monitor the second device 110b for the visual monitor position support relationship 203.

The device unplugged augmented function 205 may detect that the second device 110b is unplugged for the visual monitor unplugged support relationship 203. The detect dripping water augmented function 205 may detect a sound of water dripping near the second device 110b for the audio monitor water support relationship 203.

The monitor data 207 may be captured by the first device 110a. The monitor data 207 may include images, video, audio, or combinations thereof. The action 209 may record an alarm, notification, a notification address, or combinations thereof that may be performed by the first device 110*a*. In addition, the action 209 may be to take no action. The action 209 may be performed in response to a positive detection by the augmented function 205.

Figure 3:
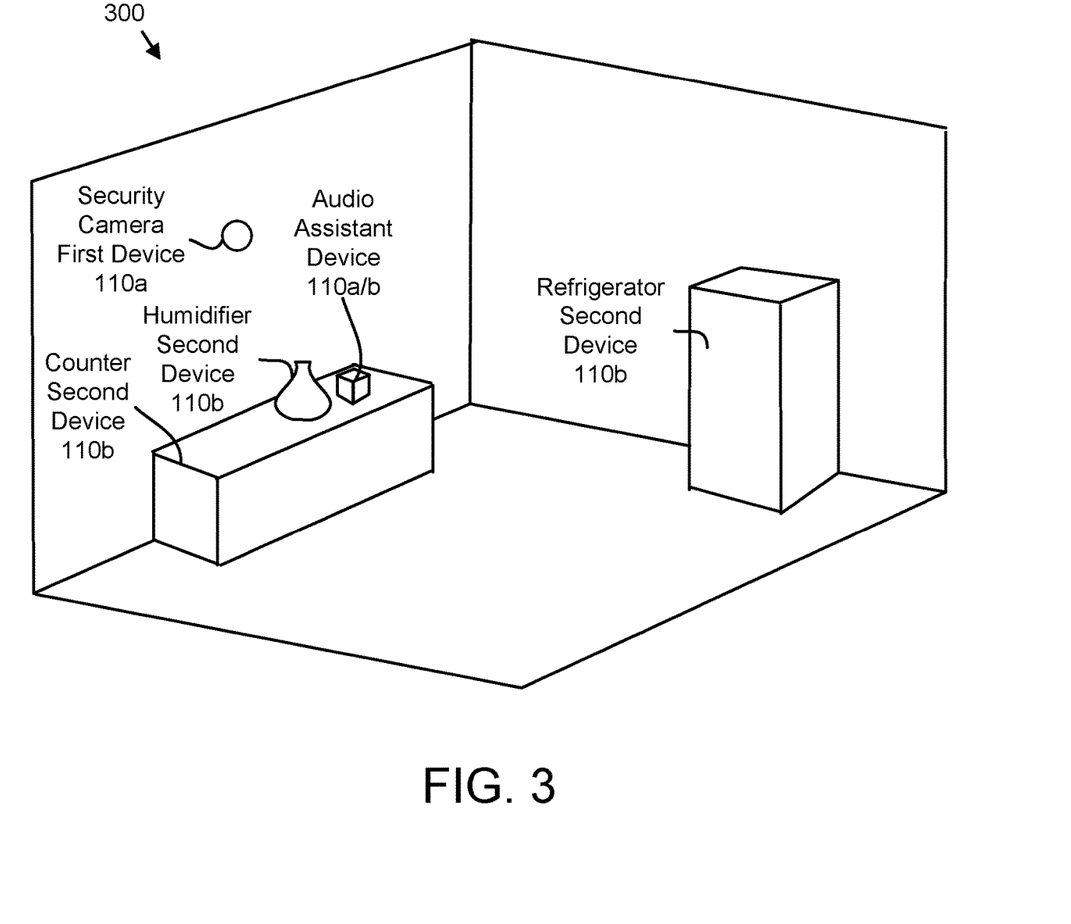
FIG. 3 is a perspective drawing illustrating one embodiment of a physical environment.

FIG. 3 is a perspective drawing illustrating one embodiment of a physical environment 300. The physical environment 300 may include first devices 110 and second devices 110 of the augmented function system 100. Some devices 110*a/b* may function as either a first device 110*a* or a second device 110*b*. The depicted embodiment includes a security camera first device 110*a*, an audio assistant device 110/*a/b*, a counter second device 110*b*, a humidifier second device 110*b*, and a refrigerator second device 110*b*.

Figure 4:
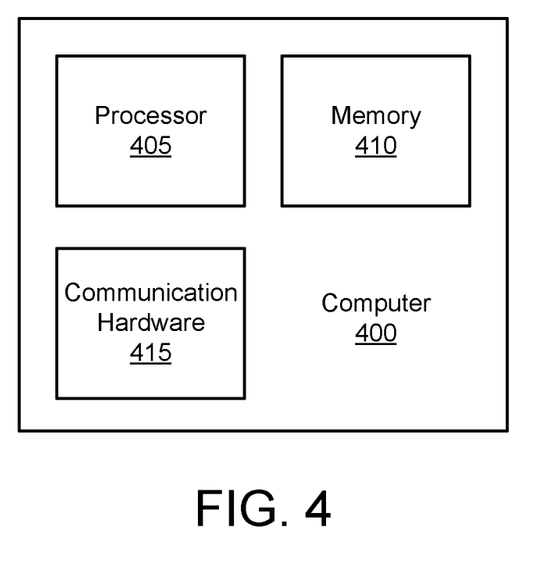
FIG. 4 is a schematic block diagram illustrating one embodiment of a computer.

FIG. 4 is a schematic block diagram illustrating one embodiment of a computer 400. The computer 400 may be embodied in the server 105, the first device 110*a*, and/or the second device 110*b*. In the depicted embodiment, the computer 400 includes a processor 405, memory 410, and communication hardware 415. The memory 410 may store code and data. The processor 405 may execute the code and process the data. The communication hardware 415 may communicate with other devices 110.

Figure 5:
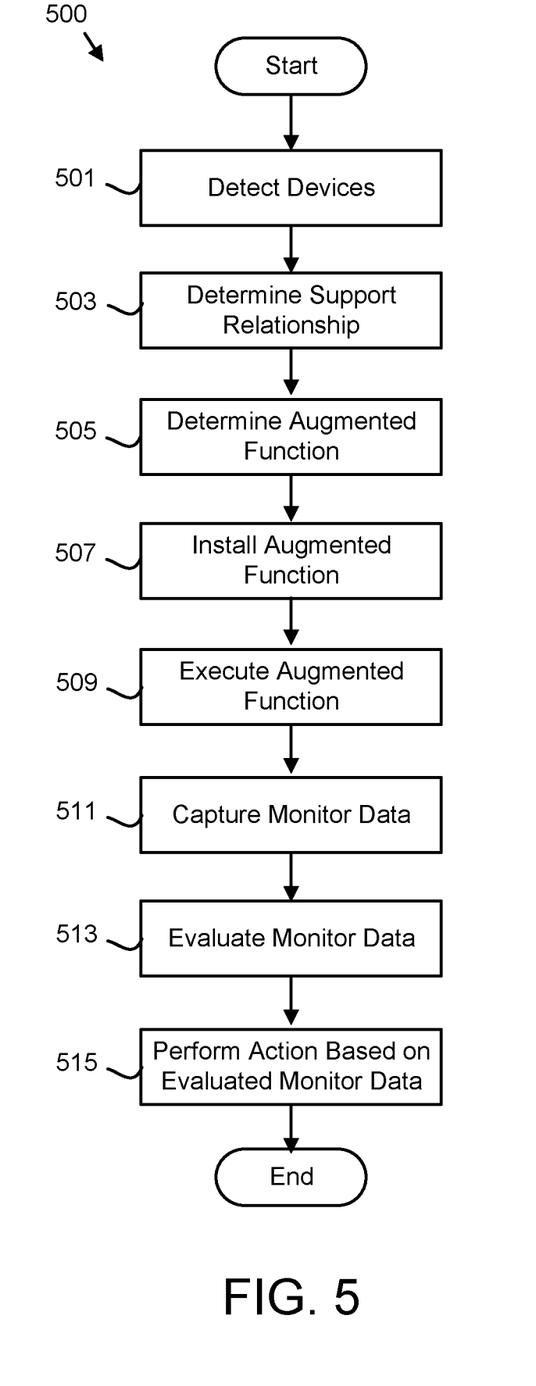
FIG. 5 is a schematic flow chart diagram illustrating one embodiment of an augmented function method.

FIG. 5 is a schematic flow chart diagram illustrating one embodiment of an augmented function method 500. The method 500 may determine and execute the augmented function 205. The method 500 may be performed by the processor 405 of the first device 110*a*, the server 105, and/or the second device 110*b*.

The method 500 starts, and in one embodiment, the processor 405 detects 501 the first device 110*a* and the second device 110*b*. The first device 110*a* may self-detect. In addition, the server 105 may detect the first device 110*a* and the second device 110*b*. In one embodiment, the first device 110*a* detects the second device 110*b*. Alternatively, the server 105 may detect the second device 110*b*.

In one embodiment, the first device 110*a* and/or second device 110*b* is detected 501 from a Link Layer Discovery Protocol (LLDP) header communicated from the device 110*a/b*. For example, the security camera first device 110*a* and/or server 105 may detect the audio assistant second device 110*a/b* from an LDP header communicated from the audio Assistant second device 110*a/b* in FIG. 3.

In one embodiment, the first device 110*a* may detect 501 the second device 110*b* by monitoring the physical environment 300. For example, the security camera first device 110*a* and/or server 105 may detect 501 the refrigerator second device 110*b* from an image of the physical environment 300. In another example, the audio assistant device 110*a/b* detects 501 the refrigerator second device 110*b* from characteristics sounds of a refrigerator operating.

In one embodiment, a user may manually detect 501 the first device 110*a* and/or the second device 110*b*. For example, the user may manually enter the identity of the first device 110*a* and/or the second device 110*b*.

The processor 405 may determine 503 the support relationship 203 between the first device 110*a* and the second device 110*b* in the physical environment 300. In one embodiment, the processor 503 determines 503 to support relationship 203 from a support relationship lookup table such as table 1. The support relationship lookup table may be stored on the server 105, the first device 110*a*, and/or the second device 110*b*.

For example, the processor 405 may identify each support relationship 203 that includes the first device 110*a* and the second device 110*b*. In one embodiment, the processor 405 determines a list of support relationships 203 based on the first device 110*a* and the second device 110*b*. For example, the processor 405 may determine 503 a visual monitor water support relationship 203 and a visual monitor open support relationship 203 for the security camera first device 110*a* and the refrigerator second device 110*b* of FIG. 3.

The processor 405 determines 505 the augmented function 205 for the first device 110*a*. The augmented function 205 provides the support relationship 203. In one embodiment, the processor 405 determines 505 the augmented function 205 from an augmented function lookup table such as table 2. The augmented function lookup table may be stored on the server 105, the first device 110*a*, and/or the second device 110*b*. In a certain embodiment, the augmented function 205 is included with the second device 110*b*. In addition, the augmented function 205 may be included with the first device 110*a*. The augmented function 205 may be determined from an online source. For example, the server 105 may include the augmented function 205.

The augmented function 205 may be determined 505 from a manual input. In one embodiment, one or more support relationships 203 are presented to the user and the user may manually determine 505 the augmented function 205 based on the support relationships 203. In a certain embodiment, one or more augmented functions 205 based on the support relationship 203 are presented to the user and the user may manually determine 505 the augmented function 205.

The processor 405 installs 507 the augmented function 205 on the first device 110*a*. The augmented function 205 may be installed as a software routine. The augmented function 205 may be installed 507 from a memory 410 of the first device 110*a*. In one embodiment, the augmented function 205 is downloaded over the network 115 such as from the server 105. In addition, the second device 110*b* may communicate the augmented function 205 to the first device 110*a*. In one embodiment, the augmented function 205 is installed 507 in response to a user permission. In a certain embodiment, the augmented function 205 is automatically installed 507.

The processor 405 executes 509 the augmented function 205 on the first device 110*a*. The augmented function 205 may be automatically executed 509. In addition, the augmented function may be executed 509 in response to a user command. The augmented function 205 may monitor the second device 110*b*. In addition, the augmented function 205 may position the first device 110*a* to monitor the second device 110*b*.

The processor 405 may capture 511 monitor data 207. The monitor data 207 may be captured 511 as part of the normal operation of the first device 110*a*. In addition, the monitor data 207 may be captured 511 using the augmented function 205.

The processor 405 may evaluate 513 the monitor data 207. The monitor data 207 may be evaluated 513 using the augmented function 205. For example, a detect water on floor augmented function 205 may evaluate 513 the monitor data 207 to detect a visual indication of water on the floor near the refrigerator second device 110*b* of FIG. 3.

The processor 405 may perform 515 the action 209 based on the evaluated monitor data 207. For example, in response to detecting water on the floor, the processor 405 may communicate a notification to a notification address as specified by the action 209. In addition, the processor 405 may take no action if the condition of the augmented function 205 is not detected from the monitor data 207.

The embodiments determine a support relationship 203 and a corresponding augmented function 205, enabling the first device 110*a* to support the second device 110*b*. As a result, the function of the first device 110a and/or the second device 110b are enhanced. In addition, the efficiency of the processor 405, the first device 110a and/or second device 110b are improved.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

The invention claimed is:

1. A method comprising:
    detecting, by use of a processor, a first device and a second device;
    determining a support relationship between the first device and the second device in a physical environment, wherein at least the first device is an electronic device;
    determining an augmented function for the first device, wherein the augmented function provides the support relationship; and
    installing the augmented function on the first device;
    executing the augmented function on the first device;
    capturing monitor data from the second device;
    evaluating the monitor data using the augmented function, and
    performing an action based on the evaluated monitor data.

2. The method of claim 1, wherein the augmented function monitors the second device.

3. The method of claim 1, wherein the augmented function positions the first device to monitor the second device.

4. The method of claim 1, wherein the augmented function is determined from an online source.

5. The method of claim 1, wherein the augmented function and/or support relationship is included with the first device.

6. The method of claim 1, wherein the augmented function and/or support relationship is included with the second device.

7. The method of claim 1, wherein the augmented function is determined from a manual input.

8. An apparatus comprising:
    a processor;
    a memory storing code executable by the processor to;
    detect a first device and a second device;
    determine a support relationship between the first device and the second device in a physical environment, wherein at least the first device is an electronic device;
    determine an augmented function for the first device, wherein the augmented function provides the support relationship; and
    install the augmented function on the first device;
    execute the augmented function on the first device;
    capture monitor data from the second device:
    evaluate the monitor data using the augmented function; and
    perform an action based on the evaluated monitor data.

9. The apparatus of claim 8, wherein the augmented function monitors the second device.

10. The apparatus of claim 8, wherein the augmented function positions the first device to monitor the second device.

11. The apparatus of claim 8, wherein the augmented function is determined from an online source.

12. The apparatus of claim 8, wherein the augmented function and/or support relationship is included with the first device.

13. The apparatus of claim 8, wherein the augmented function and/or support relationship is included with the second device.

14. The apparatus of claim 8, wherein the augmented function is determined from a manual input.

15. A program product comprising a non-transitory computer readable storage medium that stores code executable by a processor, the executable code comprising code to:
    detect a first device and a second device;
    determine a support relationship between the first device and the second device in a physical environment, wherein at least the first device is an electronic device;
    determine an augmented function for the first device, wherein the augmented function provides the support relationship; and
    install the augmented function on the first device;
    execute the augmented function on the first device:
    capture monitor data from the second device;
    evaluate the monitor data using the augmented function; and
    perform an action based on the evaluated monitor data.

16. The program product of claim 15, wherein the augmented function monitors the second device.

17. The program product of claim 15, wherein the augmented function positions the first device to monitor the second device.

* * * * *